United States Patent
Jin et al.

(10) Patent No.: US 8,898,470 B2
(45) Date of Patent: *Nov. 25, 2014

(54) METHOD AND APPARATUS FOR PERFORMING SECURITY COMMUNICATION

(71) Applicant: Samsung Electronics Co., Ltd., Gyeonggi-do (KR)

(72) Inventors: Ho Jin, Yongin-si (KR); Young-chul Sohn, Seoul (KR); Jong-baek Kim, Suwon-si (KR); Il-joo Kim, Seoul (KR)

(73) Assignee: Samsung Electronics Co., Ltd., Suwon Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/871,787

(22) Filed: Apr. 26, 2013

(65) Prior Publication Data

US 2013/0236013 A1   Sep. 12, 2013

Related U.S. Application Data

(63) Continuation of application No. 12/553,530, filed on Sep. 3, 2009, now Pat. No. 8,443,195.

(30) Foreign Application Priority Data

Feb. 24, 2009   (KR) .................... 10-2009-0015391

(51) Int. Cl.
H04L 29/06 (2006.01)
G06F 21/00 (2013.01)

(52) U.S. Cl.
CPC ............ *H04L 63/0428* (2013.01); *H04L 63/06* (2013.01); *H04L 63/04* (2013.01); *H04L 63/08* (2013.01)
USPC .......................................... 713/170; 380/278

(58) Field of Classification Search
CPC ..... H04L 63/0428; H04L 63/04; H04L 63/06; H04L 63/08
See application file for complete search history.

(56) References Cited

U.S. PATENT DOCUMENTS

2005/0188193 A1* 8/2005 Kuehnel et al. ............... 713/155

* cited by examiner

*Primary Examiner* — Izunna Okeke
(74) *Attorney, Agent, or Firm* — Sughrue Mion, PLLC

(57) ABSTRACT

Provided is a method of performing secured communication. In the method, a secured communication request for performing secured communication is received from the second device, a security key required for the secured communication is randomly generated and output, and a plurality of pieces of data encrypted using the security key are transmitted and received to and from the second device.

21 Claims, 5 Drawing Sheets

US 8,898,470 B2

METHOD AND APPARATUS FOR PERFORMING SECURITY COMMUNICATION

CROSS-REFERENCE TO RELATED PATENT APPLICATION

This application is a continuation of U.S. application No. Ser. No. 12/553,530 filed Sep. 3, 2009, which claims the benefit of Korean Patent Application No. 10-2009-0015391, filed on Feb. 24, 2009, in the Korean Intellectual Property Office, the disclosures of which are incorporated herein in their entirety by reference.

BACKGROUND OF THE INVENTION

1. Field of the Invention

Exemplary embodiments of the present invention relate to performing secured communication.

2. Description of the Related Art

When data is transmitted between devices, encryption methods have been widely used in order to protect the transmitted data.

One of these methods is a symmetric key encryption method. That is, when an A device contains a security key, the A device transmits the security key to a B device, and then data encrypted using the security key is transmitted between the A device and the B device.

Another one of these methods is a personal identification number (PIN) encryption method. That is, when an access point (AP) contains a PIN, the PIN of the AP is input to a wireless terminal which is to be connected to the AP by a user, and thus data encrypted using the PIN is transmitted between the AP and the wireless terminal.

SUMMARY OF THE INVENTION

Exemplary embodiments of the present invention provide a method and apparatus for performing secured communication.

According to an aspect of the present invention, there is provided a method of performing secured communication between a first device and a second device, the method including receiving a secured communication request for performing secured communication from the second device; randomly generating and outputting a security key required for the secured communication; and transmitting and receiving a plurality of pieces of data encrypted using the security key to and from the second device.

The method may further include: if a Universal Plug and Play (UPnP) network includes the first device and the second device, and the secured communication request is received, transmitting a uniform resource locator (URL) and port number of the first device, which is to be used in the secured communication, to the second device.

If device authentication may be required between the first device and the second device, the transmitting may include transmitting information regarding an authentication method to be used in the device authentication.

The method may further include setting a secured communication channel between the first device and the second device by using the URL and port number of the first device, wherein the data encrypted using the security key may be transmitted and received via the secured communication channel.

The data encrypted and received from the second device may be generated by inputting a value that is the same as the security key into the second device; and encrypting data by the second device using the value.

The data encrypted may be generated by encrypting at least one of an image, audio and video.

The data encrypted may be generated by encrypting authentication messages used in device authentication between the first device and the second device.

The device authentication may be performed by an authentication method selected from among at least one authentication method supported by the second device, and the authentication messages used in the device authentication may be messages for performing authentication according to the authentication method selected.

The security key may be generated using at least one of a number and a character. In addition, a user is notified of the security key as visual information or auditory information.

According to another aspect of the present invention, there is provided an apparatus for performing secured communication of a first device with respect to a second device, the apparatus including a transceiver receiving a secured communication request for performing secured communication from the second device; an encryption unit randomly generating a security key required for the secured communication, and encrypting a plurality of pieces of data by using the security key; and an outputting unit outputting the security key, wherein the transceiver may transmit and receive the data encrypted to and from the second device.

The apparatus may further include a channel setting unit setting a secured communication channel between the first device and the second device by using the URL and port number of the first device, wherein the data encrypted using the security key may be transmitted and received via the secured communication channel.

According to another aspect of the present invention, there is provided a computer readable recording medium having recorded thereon a program for executing the method of performing secured communication between a first device and a second device, the method including receiving a secured communication request for performing secured communication from the second device; randomly generating and outputting a security key required for the secured communication; and transmitting and receiving a plurality of pieces of data encrypted using the security key to and from the second device.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1:
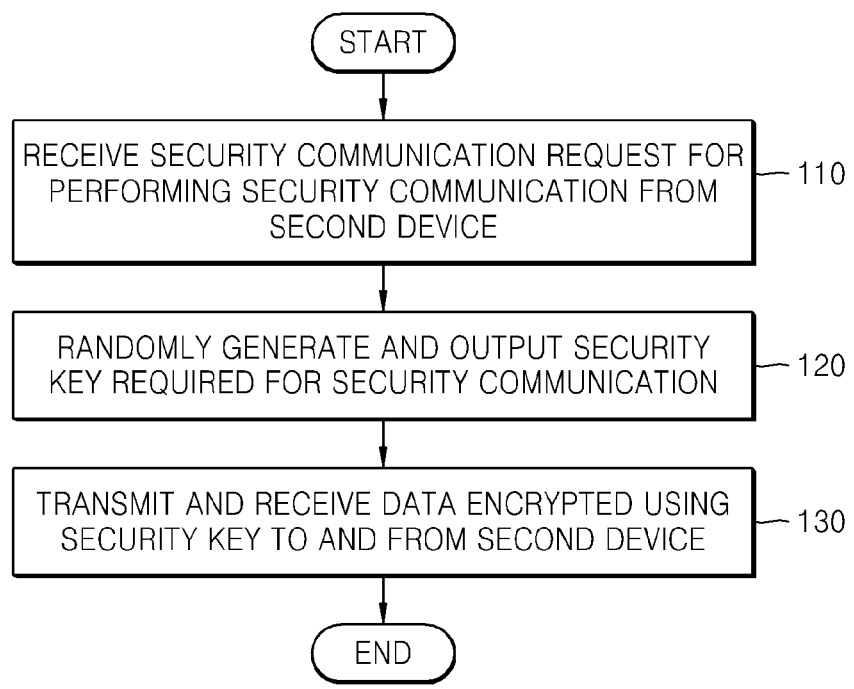
FIG. 1 is a flowchart of a method of performing secured communication according to an exemplary embodiment of the present invention.

FIG. 1 is a flowchart of a method of performing secured communication according to an embodiment of the present invention.

Hereinafter, it is assumed that a secured communication performing apparatus (not shown) according to an exemplary embodiment of the present invention is installed in a first device.

In operation 110, a secured communication request for performing secured communication is received from a second device.

In operation 120, a security key required for the secured communication is randomly generated and output.

At this time, the security key is randomly generated using at least one of a number and a character.

The security key is displayed to a user, instead of transmitting the security key to the second device.

For example, when the first device outputs "ABC1234" as the security key, the user may recognize that the security key generated by the first device is "ABC1234".

At this time, the security key may be output on an entire screen or on a pop-up window.

In operation 130, a plurality of pieces of data encrypted using the security key are transmitted between the first device and the second device.

At this time, the first device and the second device may encrypt, transmit and receive data desired by the user, or alternatively may encrypt, transmit and receive messages used in device authentication between the first device and the second device.

That is, according to the present exemplary embodiment, at least one of an image, audio and video, as well as an authentication message, may be encrypted, and transmitted between the first and second devices, and thus an authentication operation may be stably performed between the first and second devices.

At this time, the first device encrypts data by using the security key that is generated by the first device, and transmits the encrypted data to the second device.

A user inputs the same value as the security key output by the first device to the second device. Then, the second device may decode encrypted data received from the first device by using the input value of the security key, and may encrypt data to be transmitted to the first device.

According to the present exemplary embodiment, data may be encrypted and transmitted between the first and second devices by using the same security key without transmitting the security key between the first and second devices, thereby preventing the security key from being hacked or from being obtained by unauthorized individuals.

Meanwhile, in a related art if a personal identification number (PIN) of the first and second devices is once exposed to unspecified individuals, secured communication with the PIN may not be performed.

However, in the present exemplary embodiment security key is generated randomly whenever secured communication is required, and thus secured communication with a PIN may be performed even if the PIN of the first and second devices is once exposed to unspecified individuals.

Figure 2:
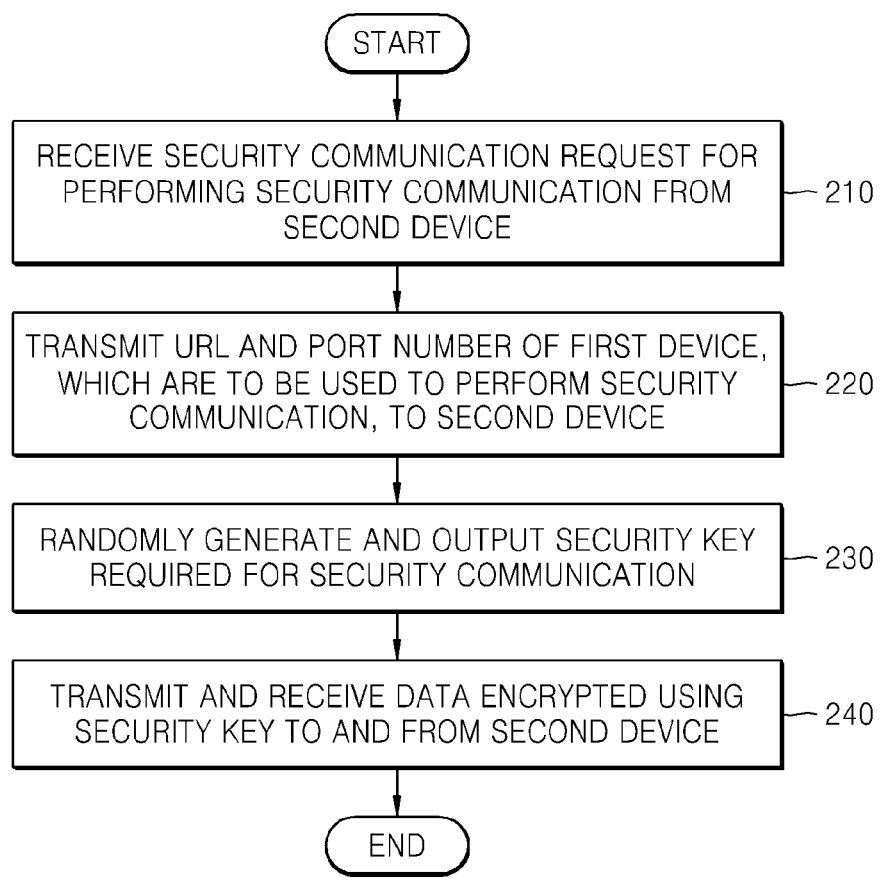
FIG. 2 is a flowchart of a method of performing secured communication according to another exemplary embodiment of the present invention.

FIG. 2 is a flowchart of a method of performing secured communication according to another exemplary embodiment of the present invention.

In the present exemplary embodiment, it is assumed that a first device and a second device are included in a Universal Plug and Play (UPnP) network.

In operation 210, a secured communication request for performing secured communication is received from the second device.

At this time, the secured communication request may include a UPnP action.

In operation 220, when the secured communication request is received, a uniform resource locator (URL) and port number of the first device, which are used to perform the secured communication, are transmitted to the second device.

At this time, when device authentication between the first and second devices is required, information regarding an authentication method used for the device authentication may be further transmitted.

In operation 230, a security key required to perform the secured communication is randomly generated and output.

In operation 240, a plurality of pieces of data encrypted using the security key are transmitted and received to and from the second device.

At this time, the second device transmits the data encrypted using the URL and port number of the first device that are received from the first device.

According to another exemplary embodiment of the present invention, a secured communication channel may be set between the first and second devices by using the URL and port number of the first device that are to be used to perform the secured communication.

For example, the first device may transmit the URL and port number of the first device that are to be used to perform the secured communication to the second device, and may simultaneously set the URL and the port number as the secured communication channel between the first device and the second device.

According to another exemplary embodiment of the present invention, the first device may transmit the URL and port number of the first device that are to be used to perform the secured communication to the second device, may receive data encrypted using the same value as the security key from the second device, and then may set the URL and port number of the first device that are to be used to perform the secured communication as the secured communication channel between the first and second devices.

When the secured communication channel is set, the first device may transmit and receive encrypted data to and from the second device via the secured communication channel.

Figure 3:
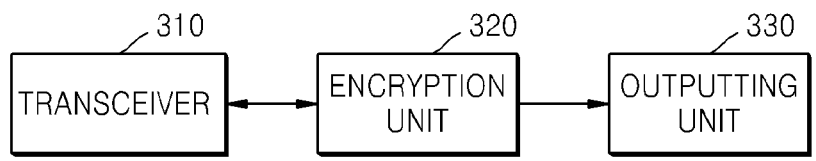
FIG. 3 is a block diagram of a secured communication performing apparatus according to an exemplary embodiment of the present invention.

FIG. 3 is a block diagram of a secured communication performing apparatus according to an exemplary embodiment of the present invention.

Referring to FIG. 3, the secured communication performing apparatus according to the present exemplary embodiment includes a transceiver 310, an encryption unit 320, and an outputting unit 330. It is assumed that the secured communication performing apparatus is installed in the first device; however the present invention is not limited thereto. Alternatively, the secured communication performing apparatus may be embodied as an independent apparatus instead of being installed in another device.

The transceiver 310 receives a secured communication request for performing secured communication from the second device.

When the transceiver 310 receives the secured communication request, the encryption unit 320 randomly generates a security key required to perform the secured communication, and encrypts data by using the security key.

As described with reference to FIG. 1, the security key is randomly generated using at least one of a number and a character.

The outputting unit 330 outputs the security key generated by the encryption unit 320.

As described with reference to FIG. 1, the security key may be output on an entire screen or on a pop-up window of a screen.

Lastly, the transceiver 310 transmits and receives data encrypted by the encryption unit 320 to and from the second device.

At this time, the encrypted data transmitted by the transceiver 310 is generated by encrypting data by using the security key generated by the encryption unit 320. The encrypted data received by the transceiver 310 from the second device is generated by encrypting data by using a value that is inputted from a user and is the same as the security key.

Figure 4:
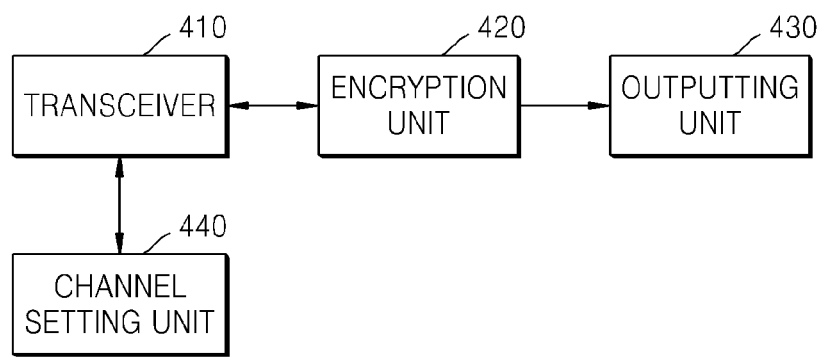
FIG. 4 is a block diagram of a secured communication performing apparatus according to another exemplary embodiment of the present invention.

FIG. 4 is a block diagram of a secured communication performing apparatus according to another embodiment of the present invention.

In FIG. 4, it is assumed that the secured communication performing apparatus according to the present exemplary embodiment is installed in the first device included in a UPnP network, and that the second device is also included in the UPnP network.

In addition, the first device and the second device may each be a UPnP controller or a UPnP controlled device.

Referring to FIG. 4, the secured communication performing apparatus according to the present exemplary embodiment includes a transceiver 410, an encryption unit 420, an outputting unit 430, and a channel setting unit 440.

When the transceiver 410 receives a secured communication request from the second device, the transceiver 410 transmits the URL and port number of the first device that are to be used to perform the secured communication to the second device.

In this case, the secured communication request may be a UPnP action, and the URL and port number of the first device may be transmitted as a response to the UPnP action.

After the transceiver 410 transmits the URL and port number of the first device to the second device, the encryption unit 420 randomly generates a security key required to perform the secured communication, and encrypts data by using the security key.

The outputting unit 430 outputs the security key generated by the encryption unit 320.

The channel setting unit 440 sets the URL and port number of the first device that are transmitted by the transceiver 410, as a secured communication channel between the first and second devices.

The channel setting unit 440 stores the URL and port number of the first device that are set as the secured communication channel.

That is, when the transceiver 410 transmits the URL and port number of the first device that are to be used to perform the secured communication to the second device, the channel setting unit 440, the URL and port number of the first device may be set as the secured communication channel between the first and second devices.

In addition, when the transceiver 410 transmits the URL and port number of the first device that are to be used to perform the secured communication to the second device, and then receives data encrypted using the same value as the security key from the second device, the channel setting unit 440 may set the URL and port number of the first device as the secured communication channel between the first and second devices in response to the reception of the encrypted data.

When the channel setting unit 440 sets the secured communication channel, the transceiver 410 transmits and receives data encrypted using the security key via the secured communication channel.

For example, the transceiver 410 may transmit and receive the encrypted data via the secured communication channel set by the channel setting unit 440, and may transmit and receive data that are not encrypted via another URL and port of the first device.

Figure 5:
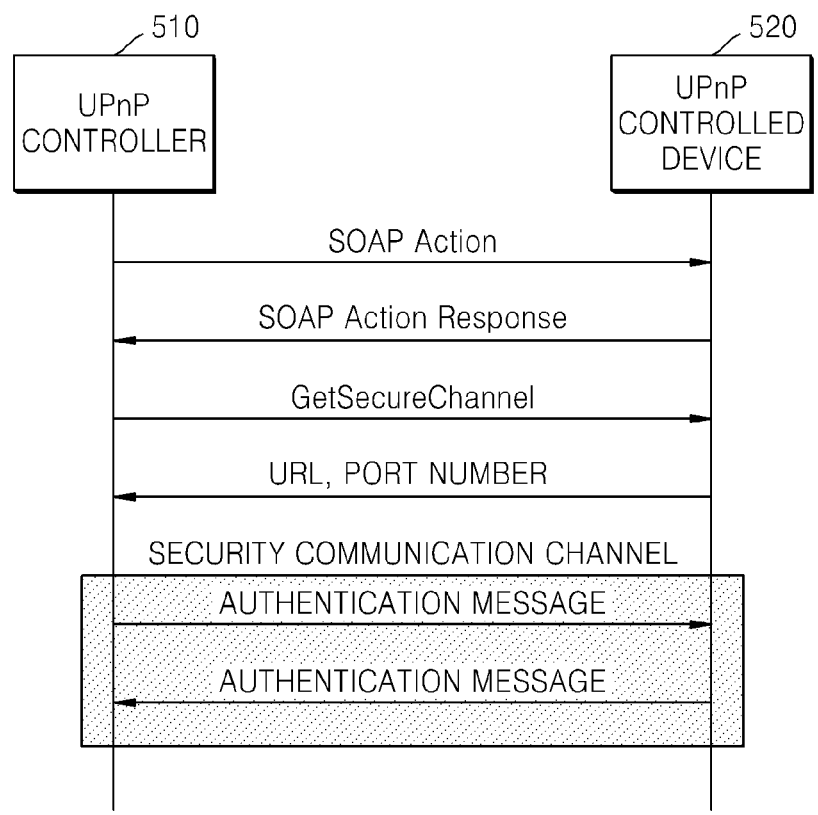
FIG. 5 is a diagram for explaining an applied example of a method of performing secured communication, according to an exemplary embodiment of the present invention.

FIG. 5 is a diagram for explaining an applied example of a method of performing secured communication, according to an exemplary embodiment of the present invention.

Referring to FIG. 5, a UPnP controller 510 transmits a UPnP Action to a UPnP controlled device 520 using a simple object access protocol (SOAP).

A UPnP controlled device 520 transmits a response to the UPnP Action to the UPnP controller 510 using the SOAP. Such a process is generally performed in a UPnP network.

The UPnP controller 510 transmits a GetSecureChannel to the UPnP controlled device 520, wherein the GetSecureChannel is a UPnPAction for requesting the UPnP controlled device 520 to set a secured communication channel required for securely performing device authentication with respect to the UPnP controlled device 520. According to another exemplary embodiment of the present invention, a UPnPAction for requesting device authentication may be transmitted together with the GetSecureChannel.

The UPnP controlled device 520 transmits a URL and a port number, which are to be used as a secured communication channel by the UPnP controlled device 520, in response to the received GetSecureChannel. According to another exemplary embodiment, the UPnP controlled device 520 may transmit information regarding an authentication method to be used in the secured communication channel by the UPnP controlled device 520. If the UPnP controlled device 520 supports a plurality of authentication methods, the UPnP controlled device 520 may select one authentication method from among the plurality of authentication methods, and may transmit the selected authentication method as the information regarding the authentication method to be used in the secured communication channel to the UPnP controller 510.

The secured communication channel is set between the UPnP controller 510 and the UPnP controlled device 520 by transmitting the URL and the port number, which are to be used in the secured communication channel by the UPnP controlled device 520, to the UPnP controller 510.

Lastly, when the secured communication channel is set between the UPnP controller 510 and the UPnP controlled device 520, authentication messages required for device authentication between the UPnP controller 510 and the UPnP controlled device 520 are transmitted between the UPnP controller 510 and the UPnP controlled device 520.

If the UPnP controlled device 520 transmits the information regarding the authentication method to be used in the secured communication channel to the UPnP controller 510, the authentication messages are based on the transmitted authentication method.

Through the above-described processes, the UPnP controller 510 and the UPnP controlled device 520 may securely perform device authentication between the UPnP controller 510 and the UPnP controlled device 520 via the secured communication channel.

In FIG. 5, each of the UPnP controller 510 and the UPnP controlled device 520 transmit the authentication only once, which is for convenience of description. According to another exemplary embodiment of the present invention, a plurality of authentication messages are transmitted between the UPnP controller 510 and the UPnP controlled device 520.

In addition, in FIG. 5, the case where authentication messages are encrypted, transmitted and received via the secured communication channel is illustrated. Alternatively, at least one of an image, audio and video may be encrypted, transmitted and received via the secured communication channel.

According to another exemplary embodiment of the present invention, only if the image, the audio and the video are important data, the image, the audio and the video may be encrypted, transmitted and received via the secured communication channel.

Figure 6:
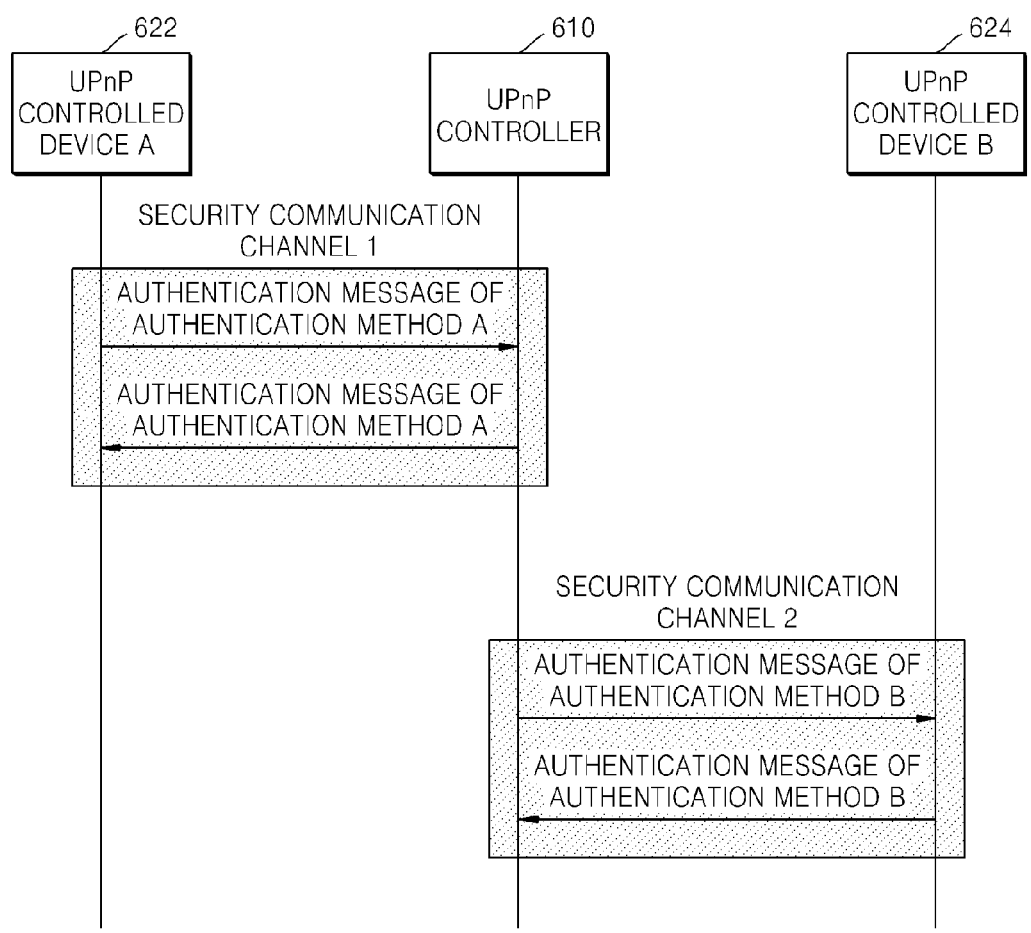
FIG. 6 is a diagram for explaining another applied example of a method of performing secured communication, according to another exemplary embodiment of the present invention.

FIG. 6 is a diagram for explaining another applied example of a method of performing secured communication, according to another exemplary embodiment of the present invention.

Referring to FIG. 6, a secured communication channel 1 is set between a UPnP controller 610 and a UPnP controlled device A 622, and a secured communication channel 2 is set between the UPnP controller 610 and a UPnP controlled device B 624.

The UPnP controller 610 and the UPnP controlled device A 622 transmit and receive authentication messages based on an authentication method A via the secured communication channel 1.

At this time, the UPnP controller 610 sets the secured communication channel 1 with respect to the UPnP controlled device A 622 by using a URL and port number of the UPnP controlled device A 622.

The UPnP controller 610 and the UPnP controlled device B 624 transmit and receive authentication messages based on an authentication method B via the secured communication channel 2.

At this time, the UPnP controller 610 sets the secured communication channel 2 with respect to the UPnP controlled device B 624 by using a URL and port number of the UPnP controlled device B 624.

According to the present exemplary embodiment, the UPnP controlled devices A and B 622 and 624 may perform device authentication with respect to the UPnP controller 610 according to an authentication method that is desired by the UPnP controlled devices A and B 622 and 624.

In addition, the UPnP controlled devices A and B 622 and 624 may set the secured communication channel independent from the UPnP controller 610 and may perform communication by using a URL and port number of the UPnP controlled devices A and B 622 and 624.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of establishing a secured communication channel between a first device and a second device, the method comprising:
    receiving a secured communication request for performing secured communication, from the second device;
    randomly generating and outputting by the first device a security key required for the secured communication channel, wherein the security key is displayed on a screen of the first device and the data encrypted and received from the second device is generated by encrypting data by the second device using a value that is inputted at the second device and is the same as the security key; and
    transmitting authentication messages encrypted using the security key,
    wherein the authentication messages are used in device authentication between the first device and the second device.

2. The method of claim 1, wherein the transmitting authentication messages comprises transmitting information regarding an authentication method to be used in the device authentication.

3. The method of claim 1, further comprising:
    transmitting and receiving a plurality of pieces of data encrypted using the security key via the secured communication channel.

4. The method of claim 3, wherein the secured communication channel is established in a Universal Plug and Play (UPnP) network.

5. The method of claim 4, further comprising:
    when the secured communication request is received, transmitting a uniform resource locator (URL) of the first device and port number of the first device, which are to be set as the secured communication channel, to the second device.

6. The method of claim 5, wherein the secured communication request is a UPnP action, and wherein the transmission of the URL and port number of the first device is a response to the UPnP action.

7. The method of claim 5, wherein the transmitting and receiving the plurality of pieces of data is accomplished by using the transmitted URL and port number of the first device.

8. The method of claim 5, wherein the encrypted data is transmitted and received via the secured communication channel, and non-encrypted data is transmitted and received via another URL and port of the first device.

9. The method of claim 1, wherein the authentication messages are encrypted by the input value.

10. The method of claim 1, wherein the device authentication is performed by an authentication method selected from among at least one authentication method supported by the second device, and
    wherein the authentication message used in the device authentication is a message for performing the device authentication according to the authentication method selected.

11. An apparatus for establishing a secured communication channel between a first device and a second device, the apparatus comprising:
    a transceiver configured to receive a secured communication request for establishing a secured communication channel, from the second device;
    an encryptor configured to randomly generate and output a security key required for the secured communication channel, wherein data encrypted and received from the second device is generated by encrypting data by the second device using a value that is inputted at the second device and is the same as the security key; and an outputter configured to output the security key on a screen of the first device;

wherein the transceiver further transmits authentication messages encrypted using the security key, and wherein the authentication messages are used in device authentication between the first device and the second device.

12. The apparatus of claim 11, wherein the transceiver further transmits information regarding an authentication method to be used in the device authentication.

13. The apparatus of claim 11, wherein the transceiver transmits and receives the encrypted plurality of pieces of data to and from the second device using the security key via the secured communication channel.

14. The apparatus of claim 13, wherein the secured communication channel is established in a Universal Plug and Play (UPnP) network.

15. The apparatus of claim 14, wherein, when the secured communication request is received, the transceiver transmits a uniform resource locator (URL) of the first device and a port number of the first device, which are to set as the secured communication channel, to the second device.

16. The apparatus of claim 15, wherein the secured communication request is a UPnP action, and wherein the transmission of the URL and port number of the first device is a response to the UPnP action.

17. The apparatus of claim 15, wherein the transceiver transmitting and receiving the plurality of pieces of data are accomplished by using the transmitted URL and port number.

18. The apparatus of claim 11, wherein the encrypted data is transmitted and received via the secured communication channel, and wherein non-encrypted data is transmitted and received via another URL and port of the first device.

19. The apparatus of claim 11, wherein the authentication messages are encrypted by the input value.

20. The apparatus of claim 11, wherein the device authentication is performed by an authentication method selected from among at least one authentication method supported by the second device, and wherein the authentication message used in the device authentication is a message for performing the device authentication according to the authentication method selected.

21. A non-transitory computer readable recording medium having recorded thereon a program for executing the method of claim 1.

* * * * *